United States Patent [19]

Godbout

[11] 3,948,463
[45] Apr. 6, 1976

[54] WEB TRANSPORT LOAD AND UNLOAD SYSTEM
[75] Inventor: Joseph Charles Godbout, Acton, Mass.
[73] Assignee: Data General Corporation, Southboro, Mass.
[22] Filed: Apr. 10, 1974
[21] Appl. No.: 459,815

[52] U.S. Cl. .................................. 242/182; 226/97
[51] Int. Cl.² .................... G11B 15/58; G11B 23/12
[58] Field of Search ........... 242/182, 183, 184, 185; 226/95, 97, 118, 91

[56] References Cited
UNITED STATES PATENTS

| | | | |
|---|---|---|---|
| 3,302,900 | 2/1967 | Messamer | 242/185 |
| 3,627,226 | 12/1971 | Setter | 242/185 |
| 3,751,604 | 8/1973 | Calizzano et al. | 242/182 |
| 3,795,371 | 3/1974 | Tolini et al. | 242/182 |
| 3,823,895 | 7/1974 | Jones et al. | 242/195 |

*Primary Examiner*—Leonard D. Christian
*Attorney, Agent, or Firm*—Jacob Frank

[57] ABSTRACT

A tape loading system for use with tape transport systems having low inertia tape loops formed in vacuum buffer columns in a tape path between the tape storage reels and the tape driving means comprising, a vacuum source for providing vacuum in the vacuum buffer columns and ascertaining a predetermined value of build-up of vacuum in the columns and upon attaining the predetermined vacuum value supplying a predetermined length of tape from the tape storage reels to each of the buffer columns. A tape unloading arrangement also provides for automatically ensuring rewind, then shutting off the vacuum source, and then applying sufficient bias for slight rotation of the storage reels to unwind the tape.

9 Claims, 4 Drawing Figures

WEB TRANSPORT LOAD AND UNLOAD SYSTEM

BACKGROUND OF THE INVENTION

1. Field of the Invention

This invention relates to a tape transport system employing a tape loop buffer between a tape driving mechanism and the tape storage reels, and more particularly, to an improved method and apparatus for loading the tape into and unloading the tape from the buffer units.

2. Description of the Prior Art

Tape transport systems are presently employed in a large number of varying applications, including high performance digital magnetic tape systems operating in conjunction with modern high-speed data processing equipment.

In such systems, it has become common to use tape buffering devices to provide for intermediate storage of tape sections sufficient to allow for temporary speed differences between the slower acting high inertia reels and the quick acting tape drive mechanism. A more preferred form of a tape buffering device comprises a tape section looped within a vacuum column.

One of the problems found in use of these vacuum column tape drives, is the audio noise produced by the magnetic tape when it is loaded into the vacuum columns. In the normal operation of the machine when the load command is given, vacuum begins to build-up in the columns and the tape is drawn into the vacuum columns. The one rushing air flowing past the tape will cause considerable tape vibration back and forth in the mouth of the columns, to produce a very annoying loud high-pitched squealing or screeching.

Another disadvantage of many tape transport systems in this area is the absence of a simplified unload feature which allows an operator to easily unload the tape without any manual direct manipulation of the reels or tape.

SUMMARY

One of the objects of the present invention is to obviate the noise problem caused by the tape loading. This is accomplished by a method and an apparatus which call for slowly building up the vacuum in the initial starting of the machine and simultaneously provide for a slight rotation of the take-up and supply storage reels.

Another object of the present invention is to alleviate the tension exerted on the tape in the tape loading process.

Yet a further object of the present invention is to provide a simple and effective tape unloading device.

DESCRIPTION OF THE PREFERRED EMBODIMENT

Figure 1:
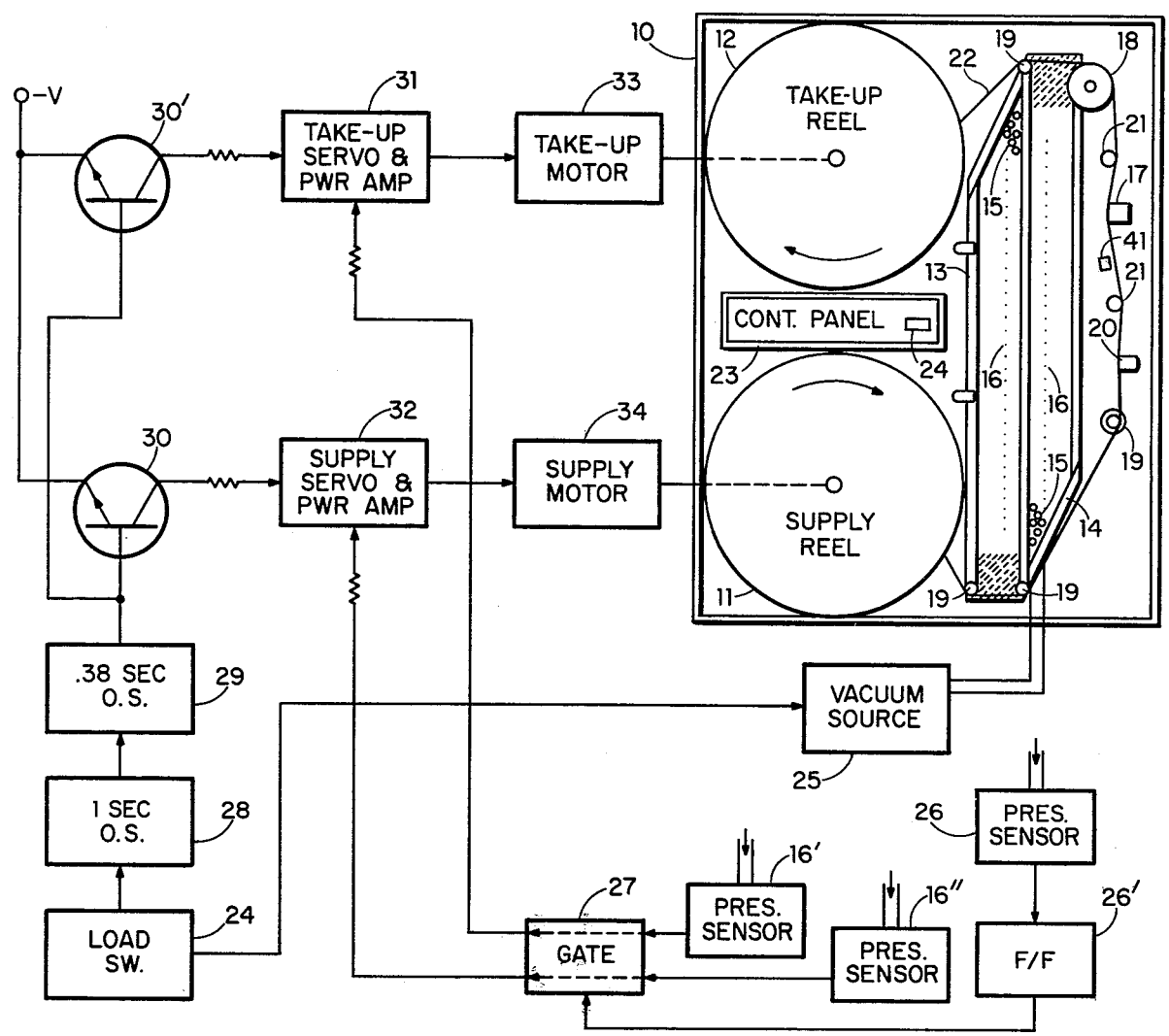
FIG. 1 is a combined block diagram of the present invention and plan view representation of a tape transport system including a tape loop system used therewith.

With reference to the drawings, there is shown in FIG. 1 a magnetic tape transport system, the general details of which are not concerned with the particular aspects of the present invention and therefore have been omitted or illustrated generally where possible in order to simplify the description, but their use will be understood by those skilled in the art.

The mechanical portions of the tape transport system are mounted on a panel 10, generally including a tape supply reel 11, a tape take-up reel 12, the designations "supply" and "take-up" being used solely for convenience since such systems are commonly bi-directional. A pair of vacuum columns 13 and 14 are arranged in parallel in a compact configuration on the front panel 10 and in parallel relation to a line running through the axis of the take-up and supply reels. Each of the columns at its rear is provided with apertures 15 which are connected through a common plenum beneath the columns (not shown) to a vacuum source. A series of smaller apertures 16 are also arranged in each vacuum column along a center line at the bottom side and connected to a separate chamber (not shown) underneath each vacuum column. Each of these latter chambers is used for detecting, through suitable pressure sensors 16' and 16'', the tape position within each column to enable the servo system to appropriately rotate the supply and/or take-up reels for providing an adequate tape loop position within each column.

To the right of the vacuum columns is a magnetic read/write head 17 assembly, and at one side of the mouth of the vacuum column 14 is a bi-directional drive capstan 18 driven by a capstan motor (not shown). Also arranged along the tape path are a series of idler rollers 19 and fix guides 21, effectively directing the path of the tape.

In normal operation, the magnetic tape 22 is moved between reels 11 and 12 in a low friction, relatively low tension tape path. The tape is driven in a forward or reverse direction past the magnetic head assembly 17 which is connected to suitable recording/reproducing circuits (not shown) with an associated data processing system. Depicted on the front of the panel with the tape transport system, is a control panel 23 having various control signals for controlling the tape transport system. In placing the tape in a transport system, the tape is threaded across the mouth of each vacuum column 13 and 14, as illustrated, about the various idler rollers 19 and fixed guides 21 and tape cleaner 20, and across the write/read head 17.

In loading the tape into the vacuum columns, a load switch 24, also shown on the control panel 23, is depressed to activate a vacuum source 25 connected to the common plenum under apertures 15. In the present embodiment, the amount of time which elapses before full vacuum is reached is approximately three seconds. This value, however, can vary from system to system. A pressure sensor 26 is connected to the common plenum to detect when the pressure in the common plenum is equal to or above 20 inches of water. The pressure sensors 16' and 16'', respectively connected from the chambers underneath the vacuum columns 13 and 14, pass signals, by way of a gate 27 (e.g. a pair of FET's, one for each line) to the respective take-up and supply servos 31 and 32. When 20 inches of water or more in the common plenum is detected by pressure sensor 26 a flip flop 26' is triggered to open the gate for enabling the servos.

During the interim period, the load switch 24 also activates a one second one-shot 28 which, in turn, activates a one-shot 29 having thirty-eight one-hundredths of a second duration. During the latter one-shot 29 period, transistors 30 and 30' are turned on to allow a fixed slight bias (+V) to be applied to each, the take-up servo 31 and the supply servo 32. These servos respectively drive the take-up and supply motors 33 and 34, for slightly spinning their respective take-up reel and supply reels in the directions shown to approximately spin off a twelve inch section of tape from each reel.

Figure 2:
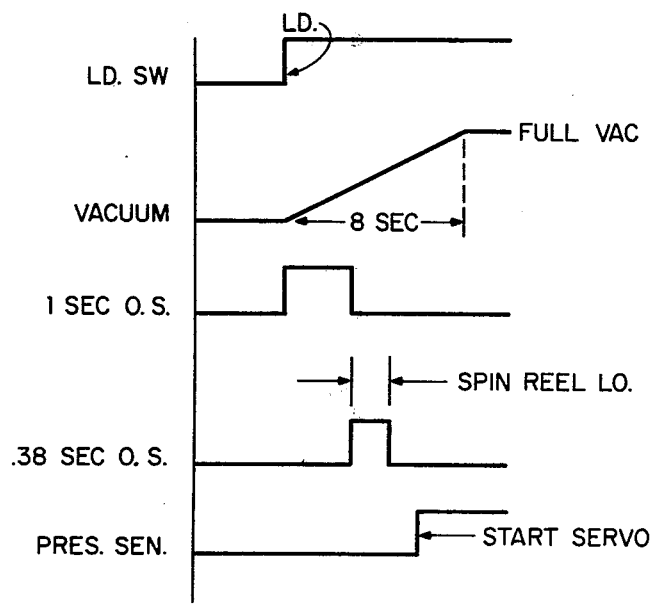
FIG. 2 is a waveform diagram showing the signals for the various electrical units in the block diagram and the vacuum source, to better illustrate the sequence of events in the operation of the present invention.
Figure 3:
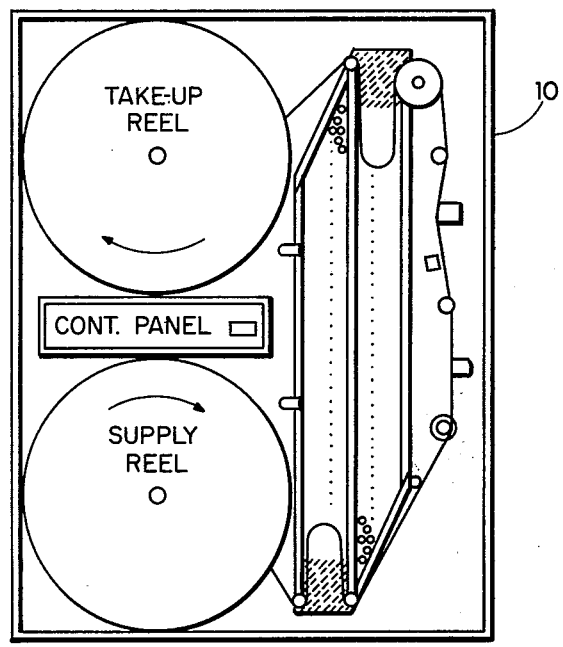
FIG. 3 is a plan view representative of the tape transport system shown in FIG. 1 with the tape loaded.

The operation may be best shown with reference to FIG. 2 wherein it is shown that after the load switch is depressed, the vacuum is built up within the one second period defined by one-shot 28, to roughly 7 inches of water vacuum or about one-third of its full vacuum capability. The 0.38 second one-shot then allows the take-up and supply reels to be rotated slowly by virtue of the application of the slight bias (−V). Due to the slight build-up of the vacuum in the vacuum columns 13 and 14, and the letting out of a section of tape by each reel, as a consequence of the slow rotation of the reels, approximately one foot of tape is sucked into each of the columns, as shown in FIG. 3.

The tape loops are now past the mouth area of each of the vacuum columns, shown by the shadowed area where the normal high-pitched squealing effect takes place in otherwise loading vacuum columns. Accordingly, by use of slight spin rotation and low vacuum application, noise is eliminated during the remainder of the vacuum build-up until full vacuum has been reached and/or the normal servo system has been enabled.

Figure 4:
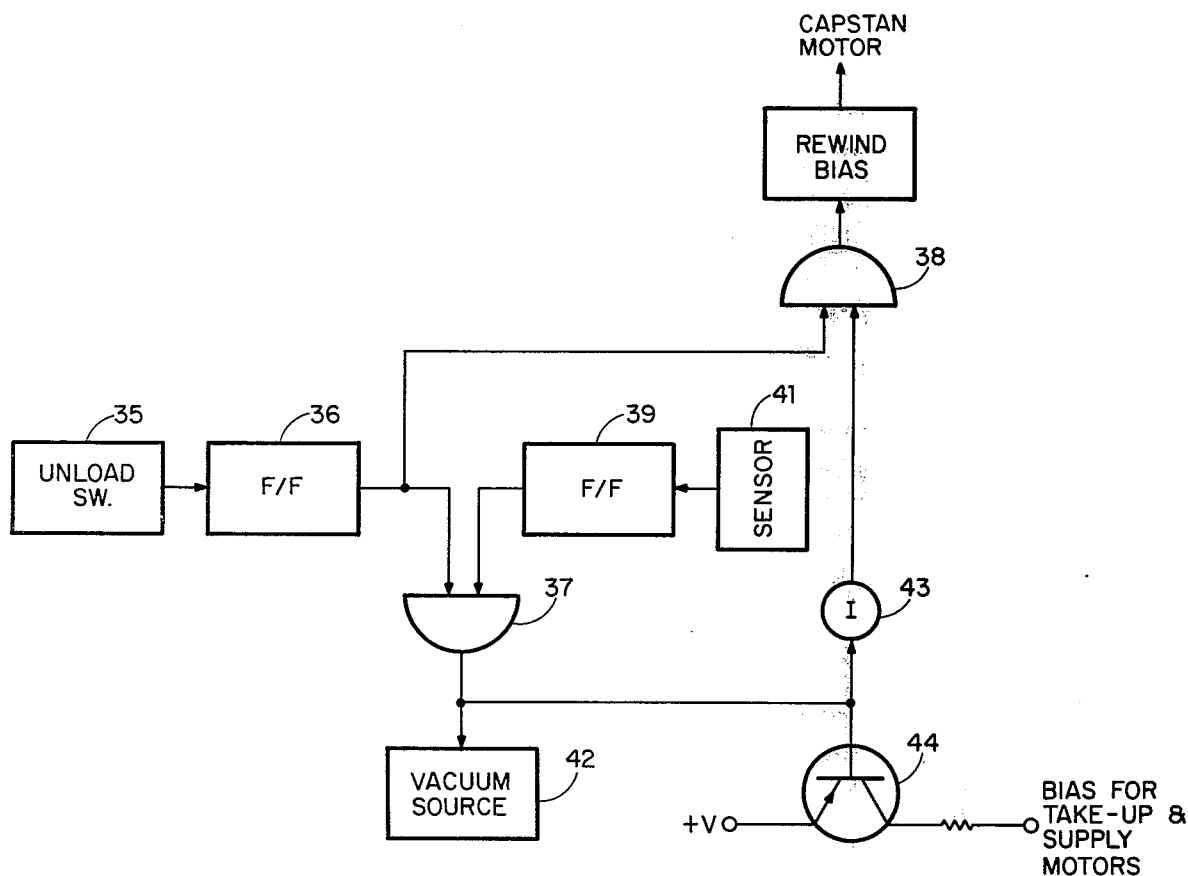
FIG. 4 is a schematic block diagram of a tape unloading circuit.

With reference to FIG. 4, there is shown a tape unloading circuitry which includes an unload switch 35 connected to a flip-flop 36 having its output connected to each of two AND gates 37 and 38. A second input to the AND gate 37 is connected from the flip flop 39 which is responsive to a conventional beginning of tape sensor (BOT) 41 adapted to be triggered in response to a foil positioned on the tape near its beginning. The output of AND gate 37 is connected to vacuum source 42, for shutting off the vacuum source applied to the vacuum columns. The output from AND gate 37 is also connected via an inverter 43 to the AND gate 38, the output of which is connected for applying capstan bias to the capstan motor. The output of AND gate 37 is also connected to a transistor 44 for turning on the transistor to pass a slight bias voltage (+V) to the take-up and supply motors for generating a slow rate of reel rotation to unwind the tape in the unloading process.

In operation, when the unload switch is depressed, if the beginning of the tape has not been sensed, AND gate 37 output remains low, however, gate 38 is enabled to cause application of the capstan bias to the capstan motor to rewind the tape until the beginning of the tape sensor 41 sensor is triggered. AND gate 37 is then enabled to shut off the vacuum source and allow the slight bias (+V) to be applied to the take-up and supply motors for unloading the tape by slight rotation of the reels.

It should be understood that the present invention, although shown in the above tape load embodiment to have one-shots of 1 second and thirty-eight hundredths of a second, these values may vary. For example, the first one shot may have a value of 0.8 to 1.2 seconds and the second one-shot may vary depending on the length of tape to be spun-off and the rotating bias applied to the motors.

What is claimed is:

1. In a tape transport system wherein low inertia tape loops are formed with vacuum column buffer means in a tape path between a take-up reel and a supply reel, tape driving means along said type path for driving the tape, said vacuum column buffer means defining an elongated enclosure having a closed end and an open end for receiving the tape loop, vacuum source means coupled to the vacuum column through an opening at the closed end of the column, the improvement comprising:
   means (concurrent) operative concurrently with the initial build-up of vacuum from said vacuum source means in said column, for automatically loading said vacuum column means within a predetermined time of said initial building of vacuum, to supply a predetermined length of tape from the supply reel of said tape storage means.

2. In a tape transport system according to claim 1 wherein said loading means includes delay means with said pre-determined time having a period equivalent to the time duration for said vacuum means to build-up to a pre-determined pressure in said column.

3. In a tape transport system according to claim 2 wherein said loading means further includes (energizing) means responsive to a selected time duration at the end of said pre-determined period (said delay means) for energizing the supply reel and take-up reel (said tape storage means for a) during said selected time duration (predetermined period) to supply said predetermined length of tape from said supply reel.

4. In a tape transport system according to claim 3 wherein the combined periods of said delay means and energizing means amount to a total period of time that elapses before a vacuum source is being built-up to half of full vacuum value to be maintained in the vacuum columns.

5. In a tape transport system according to claim 1 wherein the predetermined length of tape supplied to each vacuum column is approximately 1 foot of tape.

6. In a tape transport system, apparatus according to claim 3 wherein said delay means includes one-shot means having a period approximately of 1 second wherein said energizing means includes a one-shot having a period of approximately 0.38 seconds, where said vacuum source takes approximately 3 seconds to build-up to full vacuum to be maintained in said vacuum columns.

7. In a tape transport system wherein low inertia tape loops are formed with vacuum column buffer means in a tape path between tape storage reels means including a pair of reels and tape driving means, vacuum source means coupled to the vacuum columns, the improvement comprising:
   switch means for unloading said tape from one of said tape storage reels by shutting off said vacuum source means and automatically and simultaneously applying slight rotational unwinding bias to said reel means.

8. In a tape transport system according to claim 7 wherein said tape unloading switch means includes:
   beginning of tape sensor means, and;
   gate means for applying said bias only when said sensor is triggered to denote a beginning of the tape is sensed.

9. In a tape transport system according to claim 8 wherein said tape unloading switch means further includes: means responsive to said switch means for automatically rewinding said tape until the sensor means is triggered.

* * * * *